Patented Oct. 15, 1929

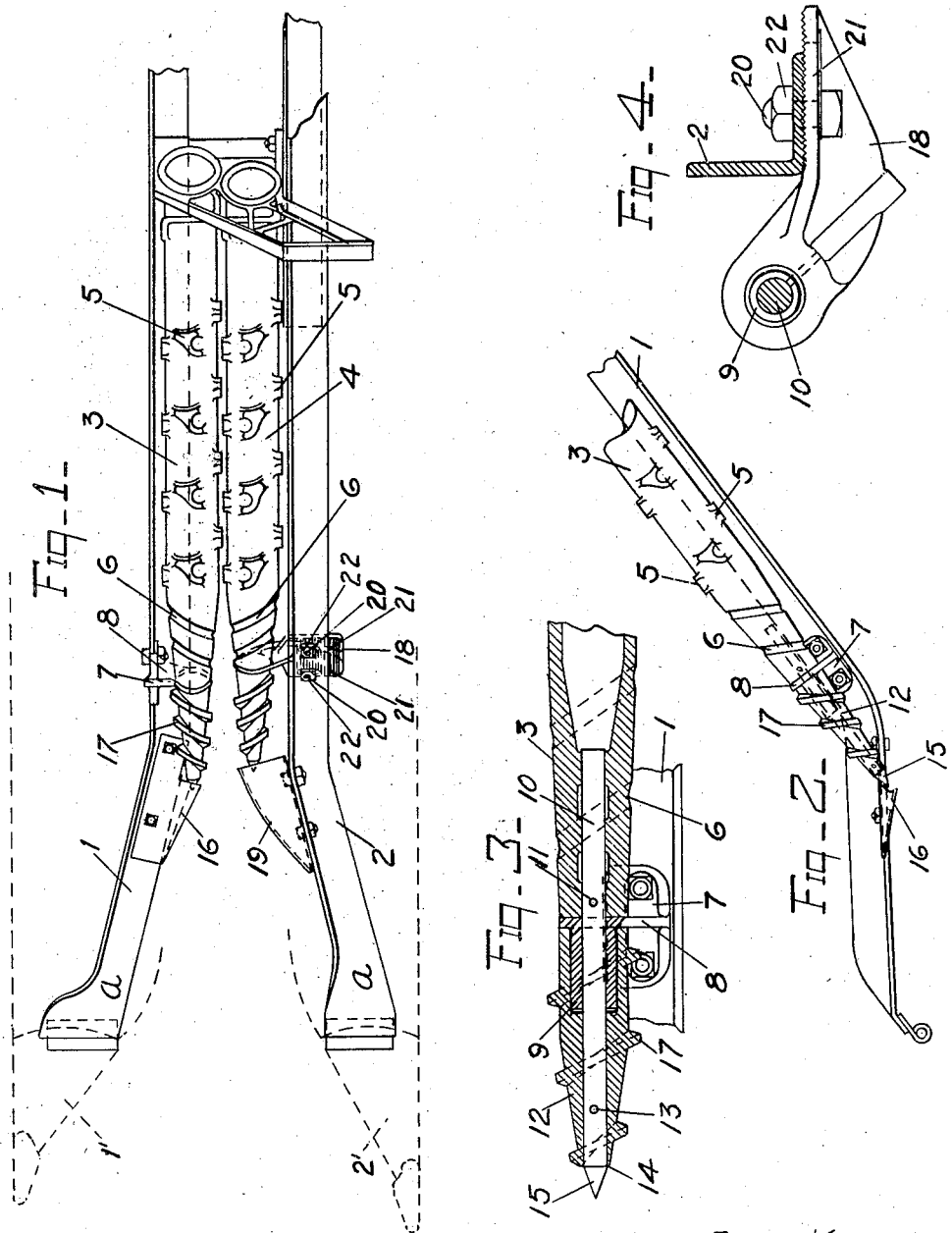

1,731,435

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

CORN HARVESTER

Application filed September 3, 1927. Serial No. 217,348.

My invention relates to corn harvesters and more particularly to that type in which the ears of corn are severed from the standing stalks. This type of machine is commonly known as corn pickers, and the object of my invention is to improve the operation of the picker rolls by so positioning the lower ends of the rolls with respect to the stalk gathering and guiding portions of the frame, with which said rolls cooperate, that broken stalks and other trash will pass directly into contact with the lower portions of the rolls and be engaged and acted upon thereby, thus preventing an accumulation of material at the lower ends of the rolls and a consequent choking of the machine.

A further object of my invention is to provide means to adjust one of the rolls toward the opposite roll to regulate the entrance space between the lower ends of the rolls.

Referring to the drawings in which similar numerals indicate identical parts:

Figure 1 is a plan view of part of a corn harvester gathering frame showing the picker rolls embodying my invention;

Figure 2 is a side view in part of one side of the frame and the picker roll mounting thereon, showing the relation of the lower end of the roll to the frame parts;

Figure 3 is an enlarged longitudinal section of the lower portion of the picker roll shown in Figure 2, and Figure 4 is an enlarged detail, in part section, illustrating an adjustable bearing for one of the picker rolls.

The part of the frame of the machine shown consists of members 1 and 2 forming the passage on opposite sides of which the picker rolls 3 and 4 are mounted and to which gathering arms 1' and 2', shown in dotted lines in Figure 1, are secured. The members 1 and 2 are bent outwardly intermediate their lengths to provide a wide throat for reception of the stalks of corn, the bent portions a being substantially horizontal, and from the bend are bent upwardly at a desired inclination, in a rearward direction. Between the members 1 and 2, the picker rolls 3 and 4 are situated, and my invention is in the manner in which the rolls are mounted, and the relation of their lower ends to the gathering arms, which form the guideway that directs the stalks of corn to the rolls.

The rolls are constructed each of two sections and are alike, differing only in length, as shown in Figure 1. The upper section of each roll is tubular and has upon its surface helically arranged teeth 5, and upon the surface of its lower portion a spiral groove 6. Mounted on the frame member 1, above and adjacent the bend thereof, is a bracket 7 having its base rigidly bolted to the member 1. Integral with the base, and extending upwardly therefrom, is an arm 8 having a forwardly projecting bearing 9. A shaft 10 is rotatably journaled intermediate its length in the bearing 9 and extends rearwardly into the forward end of the rear section of the roll 3, where it is secured by a pin 11. The forward extension of the shaft 10 supports the forward section 12 of the roll 3, which is secured upon the shaft by a pin 13. The section 12 of the roll 3 is conical, having its rear end in contact with the arm 8, and its forward end terminating on the shaft at 14, from which the shaft is pointed, the point, preferably as shown, projecting below the lower side of the part a of the member 1 and protected by a fender plate 16 bolted on the member 1. A spiral 17 is integral, preferably, with the section 12.

The roll 4 is shorter than the roll 3, but is otherwise exactly similar, and the support of its two sections on its bracket 18 is a duplicate of the manner in which the roll 3 is supported. The bracket 18, however, is adjustable to bring the rolls closer together when operating in corn of growth lighter than ordinary. The point of roll 4 is protected by a fender plate 19, the fender plates 16 and 19 tending to guide the corn stalks to the rolls and to prevent stalks passing between the rolls and the frame bars on which the rolls are respectively mounted. The bracket 18 is mounted on the underside of the frame bar 2 in the following manner: Corrugations are formed longitudinally of the bar 2 on the underside thereof; similar corrugations are formed on the upper side of the bracket 18 and are adapted to mesh with the corrugations on the bar 2. To retain the bracket in position, bolts 20 extend through slots 21 in the bracket 18 and through holes in the bar 2, the bracket 18 being rigidly held in place by operation of nuts 22 on the bolts 20. To adjust the roll 4 to or from the roll 3, I loosen the nuts 22 until the corrugations on the bracket 18 and bar 2 are sufficiently loose that they may be shifted relatively to each other. The bracket is then movable transversely of the bar 2, because of the slots 21, in the desired direction, carrying with it the roll 5, which it supports, and when the adjustment has been made I tighten the nuts 22 to draw the corrugations of the bracket and frame bar into mesh and hold them rigidly together, the fender 19 having sufficient width to protect the point of the roll irrespective of the adjustment.

What I claim is—

1. In a corn picker, the combination of frame members having their forward portions adjacent the ground and substantially horizontal, and picker rolls supported on said members terminating below the plane of the horizontal portions of said frame members.

2. In a corn picker, the combination of frame members having their forward portions adjacent the ground and substantially horizontal, brackets secured on said members, and picker rolls supported forwardly on said brackets and terminating below the plane of the horizontal portions of said members.

3. In a corn picker, the combination of frame members having their forward portions adjacent the ground and substantially horizontal, brackets including bearings mounted on said members, picker rolls comprising front and rear sections, shafts journaled in said bearings and secured within the forward part of the rear sections, said shafts extending through and secured to the front sections of the rolls and terminating below the plane of the horizontal portions of said members.

4. In a corn picker, the combination of frame members having their forward portions adjacent the ground and substantially horizontal, picker rolls supported on said members terminating below the plane of the horizontal portions of said frame members, and fenders mounted on said members forwardly of said rolls and extending rearwardly above the forward ends thereof.

5. In a corn picker, the combination of frame members, having their forward portions adjacent the ground and substantially horizontal, picker rolls terminating forwardly below the plane of the horizontal portions of said members, fenders mounted on said members and extending over and rearwardly of the forward ends of the rolls, brackets secured on said members and supporting said rolls, and means operative to adjust one of said rolls toward or from the opposite roll irrespective of its position relative to the adjacent fender.

6. In a corn picker, the combination of frame members having forwardly extending horizontal portions and upwardly and rearwardly extending portions, brackets secured on said rearwardly extending portions, bearings in said brackets, picker rolls supported in said bearings extending forwardly and downwardly therefrom, and terminating below the horizontal plane of the upper line of said forwardly extending portions.

7. In a corn picker, the combination of frame members having forwardly extending horizontal portions and upwardly and rearwardly extending portions, brackets secured on said rearwardly extending portions, bearings in said brackets, picker rolls supported in said bearings and extending forwardly and downwardly therefrom and across the horizontal plane of the upper lines of said horizontal portions, and fenders covering the forward ends of said rolls.

LOUIS A. PARADISE.